United States Patent

Platteeuw et al.

(10) Patent No.: US 6,619,680 B2
(45) Date of Patent: Sep. 16, 2003

(54) AGRICULTURAL WAGON HAVING ALL-WHEEL STEERING

(75) Inventors: Anthony M. Platteeuw, Delhi (CA); Ernest L. Wilson, Ingersoll (CA)

(73) Assignee: Wellmaster Pipe and Supply Inc., Tillsonburg (CA)

(*) Notice: Subject to any disclaimer, the term of this patent is extended or adjusted under 35 U.S.C. 154(b) by 58 days.

(21) Appl. No.: 09/984,364

(22) Filed: Oct. 30, 2001

(65) Prior Publication Data

US 2003/0079927 A1 May 1, 2003

(51) Int. Cl.⁷ ................................................ B62D 7/04
(52) U.S. Cl. ............ 280/100; 280/47.34; 280/124.111; 280/91.1
(58) Field of Search ............................ 280/99, 98, 100, 280/103, 101, 87.043, 87.01, 47.34, 124.11, 124.111, 124.114, 91.1

(56) References Cited

U.S. PATENT DOCUMENTS

| | | | |
|---|---|---|---|
| 471,007 A | * | 3/1892 | Kunzelman |
| 1,028,866 A | * | 6/1912 | Eadie |
| 1,442,708 A | * | 1/1923 | Stewart |
| 1,537,339 A | * | 5/1925 | Eadie et al. |
| 2,191,184 A | * | 2/1940 | Voorheis |
| 2,269,910 A | * | 1/1942 | Naab |
| 3,507,511 A | * | 4/1970 | Seidel |
| 4,498,554 A | | 2/1985 | Young et al. |
| 5,288,091 A | * | 2/1994 | Deschamps ............. 280/91 |
| 5,531,466 A | | 7/1996 | Hayashi |

\* cited by examiner

Primary Examiner—Avraham Lerner
(74) Attorney, Agent, or Firm—Anissimoff & Assoc.; Hans Koenig

(57) ABSTRACT

A wagon for agricultural use having an all-wheel steering mechanism. The wheels are hingedly attached to their respective axles. Steering alignment of the front wheels is provided by the wagon tongue, which is pivotally connected to the wagon frame and at least one of the front wheels. The front wheels are connected to each other by a steering linkage, consisting of two equal length members pinned to each other at a connection point. A front shaft crank is pivotally attached at the same connection point and rigidly attached to a rotatable shaft mounted with bearings to the underside of the wagon frame. Changes to the steering alignment of the front wheels causes lateral movement of the connection point, leading to rotation of the shaft and a corresponding direct change in alignment of the rear wheels, which are equipped with a similar system of linkages and cranks. This causes the front and rear wheels to follow the same path. Mounting the shaft above the axles increases ground clearance and mitigates the potential for damage to the steering mechanism. One of the axles may be pivotally attached to the wagon frame using a horizontal pin at substantially its midpoint, allowing angular pivoting of the axle in response to uneven terrain. The degree of pivoting is limited by stops integrally formed into the frame. The pivoting axle improves stability of the wagon, especially while turning and when transporting a top-heavy load.

20 Claims, 2 Drawing Sheets

AGRICULTURAL WAGON HAVING ALL-WHEEL STEERING

BACKGROUND OF THE INVENTION

1. Field of the Invention

The present invention relates to a wagon for agricultural use having an all-wheel steering mechanism. Specifically, the invention relates to an all-wheel steering mechanism for a four-wheeled wagon for use in the nursery industry.

2. Prior Art

In the nursery industry, it is common practice to use various types and sizes of wagons for the day to day transportation of plants and materials. Often the layout of the nursery is such that there is little room for these wagons to maneuver safely, without destroying nursery stock.

In general, wagons are designed with two-wheel steering. These wagons have a steerable set of front wheels, and a set of back wheels which are fixed in the forward direction. The steerable front wheels of the wagon are attached to a wagon tongue, which is attached to a tow vehicle. Turning the tow vehicle pivots the tongue, turning the front wheels of the wagon. The inherent problem with this design is that when turning, the back wheels follow a shorter path than the front wheels, which requires the operator to make a wide turn to prevent destruction of the nursery stock while turning. This problem becomes more noticeable among longer length wagons, where a great deal of room is required at the end of the row to allow the wagon to turn safely.

One solution to this problem is to steer both the front and back wheels of the wagon. This is preferably accomplished by a mechanism that translates the steering alignment of the front wheels to the back wheels. Generally, as the front wheels are turned in a certain direction, the back wheels are designed to turn in the corresponding opposite direction. The result is that the back wheels follow in the same path as the front wheels, effectively allowing the wagon to be turned in a much shorter distance.

A known mechanism used to translate the steering alignment to the rear wheels uses diagonal tie bars attached to the front and rear axles. One member is attached to the left side of the front axle, and the right side of the rear axle; whereas, the other member is attached to the right side of the front axle and the left side of the rear axle. As a result, as the front axle is steered in one direction by the tongue, the rear axle is steered in the opposite direction by the diagonal members. While this method accomplishes the desired four wheel steering action, it also has drawbacks. For example, as the diagonal members must be positioned at the level of the wheel axles, it seriously limits the ground clearance of the wagon. This exposes the steering mechanism to potential damage from obstructions. This method also has limitations as to the precision of the steering alignment, as a small imprecision in the placement of the diagonal members will result in a substantial difference between front and rear steering.

Another drawback associated with all-wheel steered wagons is their tendency towards tipping. This is especially prevalent when turning the wagon sharply on uneven terrain or with a top-heavy load. It is therefore desirable to provide means to enhance the stability of the wagon, especially over uneven terrain.

BRIEF SUMMARY OF THE INVENTION

According to this invention, there is provided an all wheel steerable wagon, that has a frame with attached front and rear axles. The axles have wheels pivotally attached to their ends. A front steering linkage is operably connected to the front wheels for tracking their steering alignment and a rear steering linkage is operably connected to the rear wheels. A transmission linkage is attached to the underside of the frame, operably inter-connecting the front and rear steering linkages, for translating the steering alignment of the front wheels to the rear steering linkage to impart a complementary steering alignment to the rear wheels, where the imparted steering alignment is a direct function of the steering alignment of the front wheels.

The transmission linkage consists of a shaft. The operable interconnection between the front steering linkage and the shaft rotates the shaft in response to movement of the front steering linkage. The operable interconnection between the shaft and the rear steering linkage moves the rear steering linkage in response to rotation of the shaft. Each steering linkage consists of a rod member and each operable interconnection consists of a crank fixedly attached to the shaft and pivotally attached to each rod member. The shaft is centrally mounted along the longitudinal axis of the wagon and each rod is aligned transversely to the shaft.

The front axle is connected to the frame of the wagon by a horizontal pin at substantially the midpoint of the axle, allowing the axle to pivot angularly about the pin in response to uneven terrain. The frame has stops integrally formed into it that are operable to limit the angular pivoting of the axle to thirty degrees by contact of the axle with the stops.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which.

PREFERRED EMBODIMENT

Referring to the accompanying diagrams, a preferred embodiment of the invention is now described.

Figure 1:
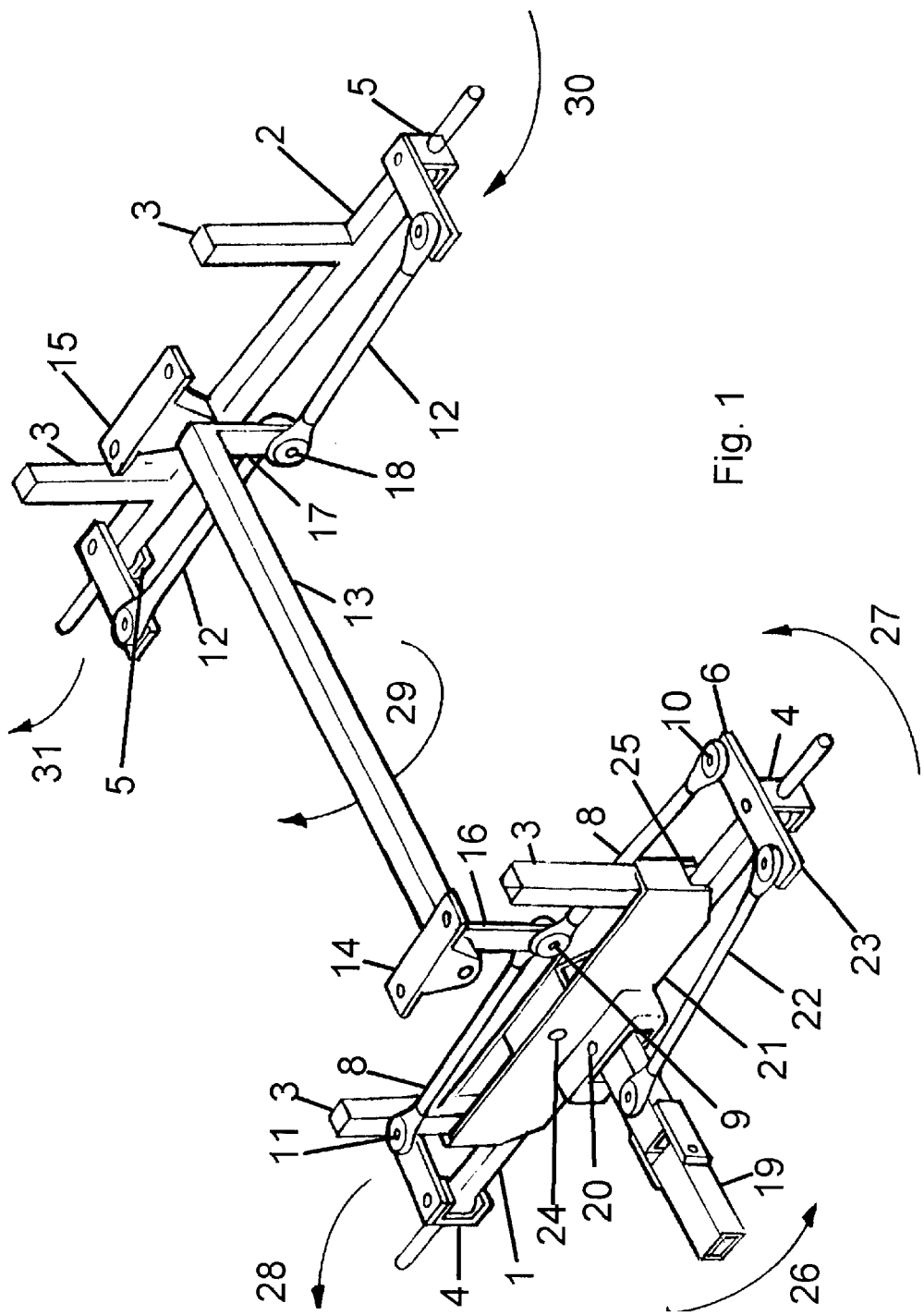
FIG. 1 is a perspective view of an embodiment of the present invention.

FIG. 1 shows one embodiment of an all-wheel steerable wagon according to the present invention. The wagon has front (1) and rear (2) axles, attached to the underside of the wagon frame (not shown) by means of vertical frame members extending downwardly from the frame (3). C-shaped hinge members (4, 5) are connected to both ends of each axle by means of a vertical pin, permitting horizontal rotation or pivoting of the hinge. Extending outwardly from each hinge member is a spindle for mounting a wheel (not shown).

In order to steer the wheels, wheel cranks (6, 7) are fixedly attached to each hinge member and forms part of the steering mechanism as will be described hereinafter. The wheel cranks attached to the front hinges (6) extend towards the rear of the wagon, whereas, the wheel cranks attached to the rear hinges (7) extend in the opposite direction towards the front of the wagon. In each case, the wheel cranks are in turn connected to one another by means of steering linkages (8, 12). The cranks thereby provide leverage for turning the wheels in response to a parallelogram movement of the steering linkage.

The front steering linkage (8) consists of two rod members of equal length that are pinned (9) at their ends to one another and to their respective hinges at their opposite ends (10, 11). In principle, steering of the wheels is accomplished by lateral movement of the connection point identified at 9, which causes the steering linkage to act on the wheel cranks, thereby pivoting the hinges and effecting steering alignment of the wheels. The rear steering linkage (12) is similarly constructed and functions in a similar manner, as can be seen from the figure.

A longitudinal shaft (13) connecting the front and rear steering linkages is mounted using brackets (14, 15) bolted to the underside of the wagon frame. The brackets are positioned at the ends of the shaft and contain bearings which allow the shaft to rotate within the brackets. Attached to the extremities of the shaft are front (16) and rear (17) shaft cranks by means of a rigid connection. The opposite ends of the shaft cranks are pivotally attached to their respective steering linkages at the connection points of the rods, 9 and 18.

Lateral movement of the front steering linkage connection point at 9 in response to a change in steering alignment causes the front shaft crank (16) to pivot, thereby causing a corresponding and direct rotation of the shaft (13). The shaft functions as a transmission linkage to translate the steering alignment of the front wheels to the rear wheels. The rear shaft crank (17) is parallel to the front shaft crank (16) and rotates with the shaft, thereby effecting a corresponding lateral movement of the rear steering linkage connection point at 18 in the same direction. Since the front (6) and rear (7) wheel cranks extend from the wheel hinges in opposite inward directions, the lateral movement of the rear steering linkage (12) causes the rear wheels to adopt a complementary steering alignment opposite in direction to that of the front wheels. This allows the rear wheels to follow a similar path to the front wheels throughout the turn.

The steering alignment of the front wheels of the wagon is determined by the position of the wagon tongue (19), which is pivotally connected by a vertical pin (20) to the frame housing the front axle (21). This allows the wagon tongue to pivot horizontally in response to changes in direction of the towing vehicle (not shown). A pinned rod member (22) is provided connecting the tongue to a forwardly extending wheel crank (23) attached to one of the front wheel hinges. Pivoting of the wagon tongue causes the attached front wheel hinge to pivot in the same direction, thus causing a corresponding change in steering alignment of the front wheels. The rear wheels assume a complementary steering alignment due to rotation of the shaft as previously described.

The front axle (1) is attached at substantially its midpoint to the frame housing the front axle (21) by a horizontal pin (24), permitting angular pivoting of the front axle. This allows the wagon to overcome tipping problems associated with turning over uneven terrain, or otherwise while turning when transporting a top-heavy load. The frame housing the front axle (21) has horizontal stops (25) which are integrally formed into the frame. The stops are designed to limit the degree of pivoting of the front axle (1). The stops in the preferred embodiment shown limit the maximum degree of pivoting to thirty degrees, but more typically, the axle pivots less than fifteen degrees in response to typically uneven terrain.

FIG. 1 will now be described with reference to the arrows indicating the direction of movement of the parts in response to a change in steering alignment. The forward direction is the direction that the wagon would be towed by a vehicle attached to the wagon tongue (not shown). In context of the description of the figures, "push" indicates a force placing the member being pushed in compression, whereas "pull" indicates a force placing the member being pulled in tension.

Looking in the forward direction, the arrow (26) indicates a left turn of the wagon tongue (19). The wagon tongue (19) will pivot to the left, pushing the attached rod member (22) connected to the forwardly extending wheel crank of the left front wheel (23). This causes the left front wheel to horizontally pivot in a counter-clockwise direction (27), as viewed from above. The steering linkage connecting the front wheels (8) moves laterally to the right, causing the right front wheel to similarly horizontally pivot (28).

The front shaft crank (16), pivotally attached to the front steering linkage (8) at the point of connection of the two rod members (9), pivots counter-clockwise, as viewed when facing the forward direction. This causes a counter-clockwise rotation (29) of the shaft to which it is perpendicularly and fixedly attached, producing a corresponding rotation of the rear shaft crank (17).

The rear shaft crank (17) is pivotally attached to the rear steering linkage (12). The rear steering linkage (12) translates to the right, causing a clockwise rotation of both of the attached rear wheels (30, 31). This causes the rear wheels to follow substantially the same path as the front wheels throughout the turn.

Figure 2:
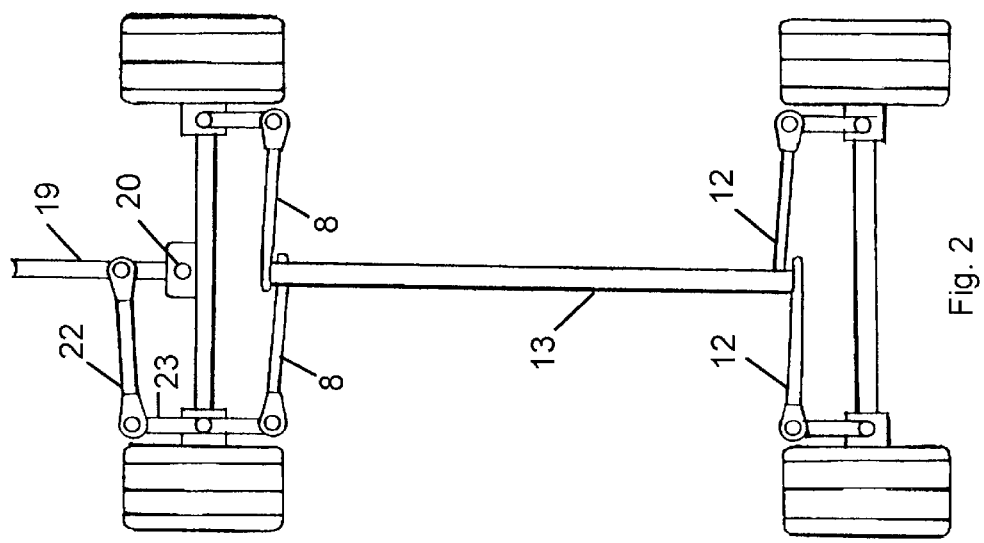
FIG. 2 is a top view of an embodiment of the present invention.

FIG. 2 shows a top view of the wagon wheels when traveling straight ahead. The wagon tongue (19) is shown, pivotally connected to the frame housing the front axle (20) and connected to the left front wheel by a pinned rod member (22) attached to the forwardly extending wheel crank (23).

Figure 3:
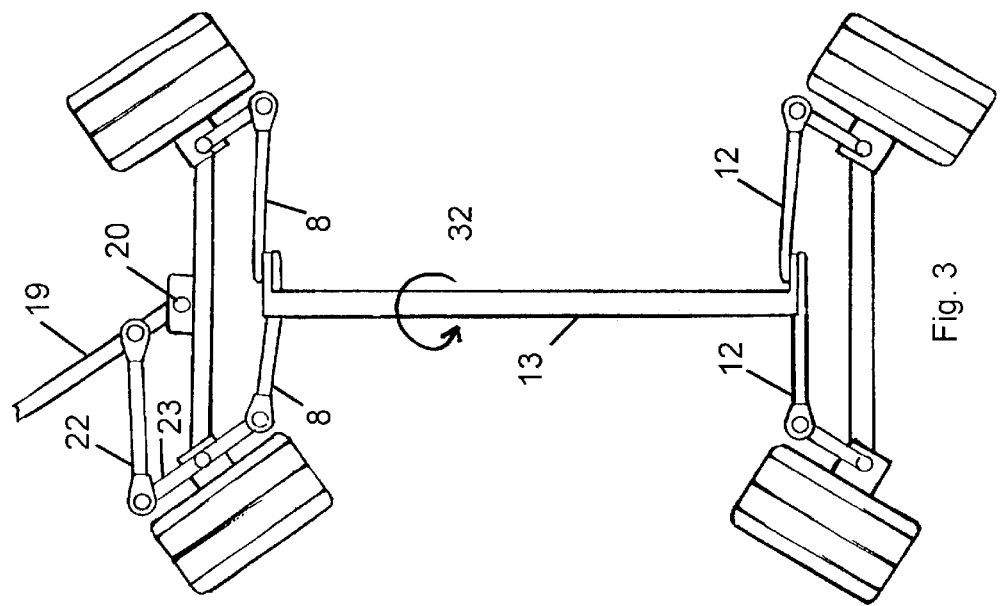
FIG. 3 is a top view of an embodiment of the present invention, with the wheels aligned in a turning position.

The change in steering alignment is illustrated with reference to FIG. 3, which shows a top view of the wagon wheels positioned for a left turn. The front steering linkage (8) has moved to the right, causing pivoting of the front shaft crank (16) to the right in turn, causing counter-clockwise rotation (32) of the shaft (13) as shown. The rotation of the shaft translates the steering alignment to the rear wheels by means of the rear shaft crank (17) and movement of the rear steering linkage (12). The rear wheels correspondingly turn in the opposite direction to the front wheels.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. An agricultural wagon comprising:
a) a frame;
b) a front axle and a rear axle attached to the frame, each axle having two ends;
c) front wheels pivotally attached to each end of the front axle and rear wheels pivotally attached to each end of the rear axle;

d) a front steering linkage operably connected to the front wheels and a rear steering linkage operably connected to the rear wheels;

e) a rotatable shaft operably interconnecting the front and rear steering linkages above the front and rear steering linkages;

f) a front shaft crank and a rear shaft crank, each shaft crank rigidly attached to the shaft, the front shaft crank pivotally attached to the front steering linkage and the rear shaft crank pivotally attached to the rear steering linkage; and, g) the front wheels having a steering alignment, the front steering linkage operable to act upon the front shaft crank, the front shaft crank rotating the shaft, the rear shaft crank acting upon the rear steering linkage, the rear steering linkage operable to effect a steering alignment of the rear wheels complementary to the steering alignment of the front wheels.

2. The wagon of claim 1, wherein the front axle is pivotally attached to the frame to permit angular movement of the front axle in response to uneven terrain.

3. The wagon of claim 2, wherein the front axles is pivotally attached to the frame by a horizontal pin means at the midpoint of the axle.

4. The wagon of claim 3, wherein the angular movement of the front axle is between 0 and 30 degrees with respect to horizontal.

5. The wagon of claim 3, wherein the angular movement of the front axle is between 0 and 15 degrees with respect to horizontal.

6. The wagon of claim 1, wherein the shaft is journaled to the underside of the frame.

7. The wagon of claim 1, wherein each shaft crank is mounted at an extremity of the shaft.

8. The wagon of claim 1, wherein the steering alignment of the rear wheels is in the opposite direction to the steering alignment of the front wheels.

9. The wagon of claim 8, wherein the front and rear shaft cranks are perpendicular to the shaft.

10. The wagon of claim 9, wherein the front and rear shaft cranks are vertical when the steering alignment is straight.

11. The wagon of claim 1, wherein each wheel comprises a vertical hinge member for pivotally attaching the wheel to its respective axle and a horizontal spindle extending outwardly from the hinge member for rotationally mounting the wheel.

12. The wagon of claim 11, wherein the front and rear steering linkages comprise a wheel crank attached to each hinge member and a rod member pivotally attached to each wheel crank, each rod member pivotally attached to a front or rear shaft crank, respectively.

13. The wagon of claim 1, wherein the wagon comprises a tongue pivotally attached to the frame and connected to at least one of the front wheels, pivoting of the tongue causing a change in the steering alignment of the front wheels.

14. An agricultural wagon comprising:

a) a frame;

b) a front axle pivotally attached to the frame to permit angular movement of the front axle in response to uneven terrain and a rear axle fixedly attached to the frame, each axle having two ends;

c) front wheels pivotally attached to each end of the front axle and rear wheels pivotally attached to each end of the rear axle, the front wheels having a steering alignment and the rear wheels having a steering alignment complementary thereto;

d) a front steering linkage operably connected to the front wheels and a rear steering linkage operably connected to the rear wheels; and, e) a transmission linkage operably interconnecting the front and rear steering linkages for translating the steering alignment of the front wheels to the rear wheels.

15. The wagon of claim 14, wherein the front axle is pivotally attached to the frame by a horizontal pin means at the midpoint of the axle.

16. The wagon of claim 15, wherein the angular movement of the front axle between 0 and 30 degrees, with respect to horizontal.

17. The wagon of claim 15, wherein the angular movement of the front axle is between 0 and 15 degrees with respect to horizontal.

18. The wagon of claim 14, wherein the transmission linkage comprises a rotatable shaft longitudinally aligned with the frame, a front shaft crank, and a rear shaft crank, each shaft crank rigidly attached to the shaft, the front shaft crank pivotally attached to the front steering linkage and the rear shaft crank pivotally attached to the rear steering linkage.

19. The wagon of claim 18, wherein the front steering linkage is operable to act upon the front shaft crank, the front shaft crank rotating the shaft, the rear shaft crank acting upon the rear steering linkage, the rear steering linkage operable to effect a steering alignment of the rear wheels complementary to the steering alignment of the front wheels.

20. The wagon of claim 19, wherein the shaft is above the front and rear steering linkages.

* * * * *